US006571973B1

(12) United States Patent
Tripsianes (10) Patent No.: US 6,571,973 B1
(45) Date of Patent: Jun. 3, 2003

(54) CUP LID WITH COOLING SPILLOVER CHAMBER

(76) Inventor: Lazaros C. Tripsianes, 1555 N. Dearborn Pkwy., Apt. 16A, Chicago, IL (US) 60610

( * ) Notice: Subject to any disclaimer, the term of this patent is extended or adjusted under 35 U.S.C. 154(b) by 0 days.

(21) Appl. No.: 09/851,531

(22) Filed: May 7, 2001

(51) Int. Cl.[7] .................................................. B65D 51/18
(52) U.S. Cl. ...................................... 220/256; 222/254
(58) Field of Search ................................ 220/256, 255, 220/254, 521, 522, 525, 526, 703, 114, 721, 722, 711, 713, 731, 734, 501; 222/454–457, 437, 438; 225/109, 158

(56) References Cited

U.S. PATENT DOCUMENTS

| | | | | |
|---|---|---|---|---|
| 2,190,092 A | * | 2/1940 | Bailey | 222/158 |
| 2,204,104 A | * | 6/1940 | Masters | 222/424.5 |
| 3,152,735 A | * | 10/1964 | Caldwell | 222/455 |
| 4,116,371 A | * | 9/1978 | Towns et al. | 222/455 |
| 4,613,064 A | * | 9/1986 | Meyer et al. | 222/455 |
| 5,054,660 A | * | 10/1991 | Sherman et al. | 222/454 |
| 5,261,575 A | * | 11/1993 | Keller | 222/455 |
| 5,873,493 A | * | 2/1999 | Robinson | 222/109 |
| 6,176,390 B1 | * | 1/2001 | Kemp | 220/711 |

* cited by examiner

Primary Examiner—Lee Young
Assistant Examiner—Lien Ngo
(74) Attorney, Agent, or Firm—Niro, Scavone, Haller & Niro (57) ABSTRACT

A lid for a cup having a rim has a first component having a sip opening, the sip opening being located on the first component so as to be adjacent the rim of the cup when the lid is mounted on the cup. The lid further includes a second component having an edge defining at least a portion of a spill opening, the spill opening being spaced from the sip opening substantially along a line corresponding to a diameter of the rim of the cup when the lid is mounted on the cup. The lid still further includes a spillover chamber connected to the second component so as to receive liquid from within the cup through the spill opening when the cup is tipped toward the second position, the spillover chamber being outside of the cup when the lid is mounted on the cup. Finally, the lid includes a transfer structure providing a path to transfer liquid from the spillover chamber to the sip opening when the cup is tipped toward the sip opening, and a barrier to prevent transfer of liquid from within the cup to the sip opening without passing through the spillover chamber in any tipping position of the cup.

30 Claims, 9 Drawing Sheets

CUP LID WITH COOLING SPILLOVER CHAMBER

FIELD OF THE INVENTION

This invention relates to lids for cups, and especially to lids that enable the holder to drink from the cup without removing the entire lid.

BACKGROUND OF THE INVENTION

In today's rushed world, the sight of people hurrying down the sidewalk drinking coffee or other beverages from takeout plastic, paper or styrofoam cups has become commonplace. An essential element in making such drinking on the run enjoyable is the development of cup lids, made from plastic or other suitable materials, that clip onto the rim of the cup and partially or completely seal the cup to prevent the liquid inside from easily spilling. Such lids have a sip opening through which the liquid in the cup can be accessed, with the sip opening being either a permanent opening or initially covered by a tear-away portion that is displaced to permit sipping from the cup. The relatively small size of the sip opening acts to reduce the possibility of spilling the liquid, as opposed to the case when no lid is provided.

One difficulty remaining in making such drinking on the run as pleasant as possible is that the coffee is usually served while very hot, with the presence of the lid helping to keep the coffee inside hot by preventing it from cooling down at anything other than a slow rate. While this heat retention is advantageous after the coffee has reached an acceptable temperature, it is frustrating to the drinker who may want to start drinking right away. Moreover, different drinkers will have their own ideal temperatures for drinking. As a result, the drinker often keeps taking experimental sips, scalding lips and tongue until the coffee is drinkable, and often consuming a goodly quantity of the coffee in its overheated condition.

Two ways to accelerate the cooling process would be to make the sip opening larger or to remove the lid completely until the coffee has cooled down sufficiently. However, this would not only increase the possibility of spillage, but would also make all of the coffee in the cup cool down more quickly. In that case, while the first sips might be at the right temperature, the remaining coffee would still cool down slowly so that the final sips of coffee would be undesirably cold.

Still further, although the cup lid could be made disposable for takeout, the cups and cup lids could be made non-disposable, as for example with thermos-type hot or cold drink cups. In either case, requiring the lid to be removed for cooling can be inconvenient and presents the risk of misplacing the lid or exposing it to dirt and germs.

It is an important consideration to correct these difficulties using a lid design so that any extra cost incurred will be acceptable to both sellers and buyers of the cups and lids.

OBJECTS AND SUMMARY OF THE INVENTION

Accordingly, it is an object of the present invention to provide a lid for a cup that avoids the above-discussed difficulties of the prior art.

It is another object of the present invention to provide a lid for a cup, such as a takeout coffee cup, that enables a small portion of the hot liquid inside to be cooled rapidly for immediate drinking while the remainder of the liquid is kept hot.

It is yet another object of the present invention to provide such a lid that provides at least the same protection against spillage as conventional lids.

It is still another object of the present invention to provide such a lid that uses conventional design to the extent possible.

The above objects, as well as additional advantages, will be realized in the practice of the invention as herein described. In its broadest embodiment, the lid for a cup having a rim comprises a first component having a sip opening, the sip opening being located on the first component so as to be adjacent the rim of the cup when the lid is mounted on the cup. The lid further comprises a second component having an edge defining at least a portion of a perimeter of a spill opening, the spill opening being spaced from the sip opening substantially along a line corresponding to a diameter of the rim of the cup when the lid is mounted on the cup. The lid still further comprises a spillover chamber connected to the second component so as to receive liquid from within the cup through the spill opening when the cup is tipped toward the spill opening, the spillover chamber being outside of the cup when the lid is mounted on the cup. Finally, the lid comprises a transfer structure providing a path to transfer liquid from the spillover chamber to the sip opening when the cup is tipped toward the sip opening, the transfer structure including a barrier to prevent transfer of liquid from within the cup to the sip opening without passing through the spillover chamber in any tipping position of the cup.

In another embodiment, a lid for a cup comprises an upper component having a sip opening, and a lower component having an edge defining at least a portion of a perimeter of a spill opening and a spillover chamber open to the spill opening, wherein the spillover chamber is positioned on the lid so as to be outside of the cup when the lid is mounted on the cup. When the lower component is attached to the upper component with the spill opening substantially spaced peripherally from the sip opening, the upper component and the lower component define a cavity therebetween allowing liquid to flow in a selected one only of first and second paths depending upon a tipping direction of the lid, wherein the first path is from the spill opening to the spillover chamber and the second path is from the spillover chamber to the sip opening.

In a further development of the present invention, a method of drinking from a cup having one of the above-described lids mounted thereon comprises the steps of first tipping the cup toward the spill opening so that liquid in an interior of the cup flows through the spill opening to the spillover chamber, and subsequently tipping the cup toward the sip opening so that liquid in the spillover chamber flows to the sip opening.

In any of these embodiments, the two components may be permanently attached or removably attachable, the two components may be manufactured separately or as a unit, or the spillover chamber may be an integral part of the cup.

These and other objects, features and aspects of the present invention will be apparent from the following description of the preferred embodiments taken in conjunction with the attached drawings.

BRIEF DESCRIPTION OF THE DRAWINGS

The invention will be further described with reference to the drawings in which like elements are represented by the same number.

DETAILED DESCRIPTION OF THE PREFERRED EMBODIMENTS

Figures 1, 2, 3:
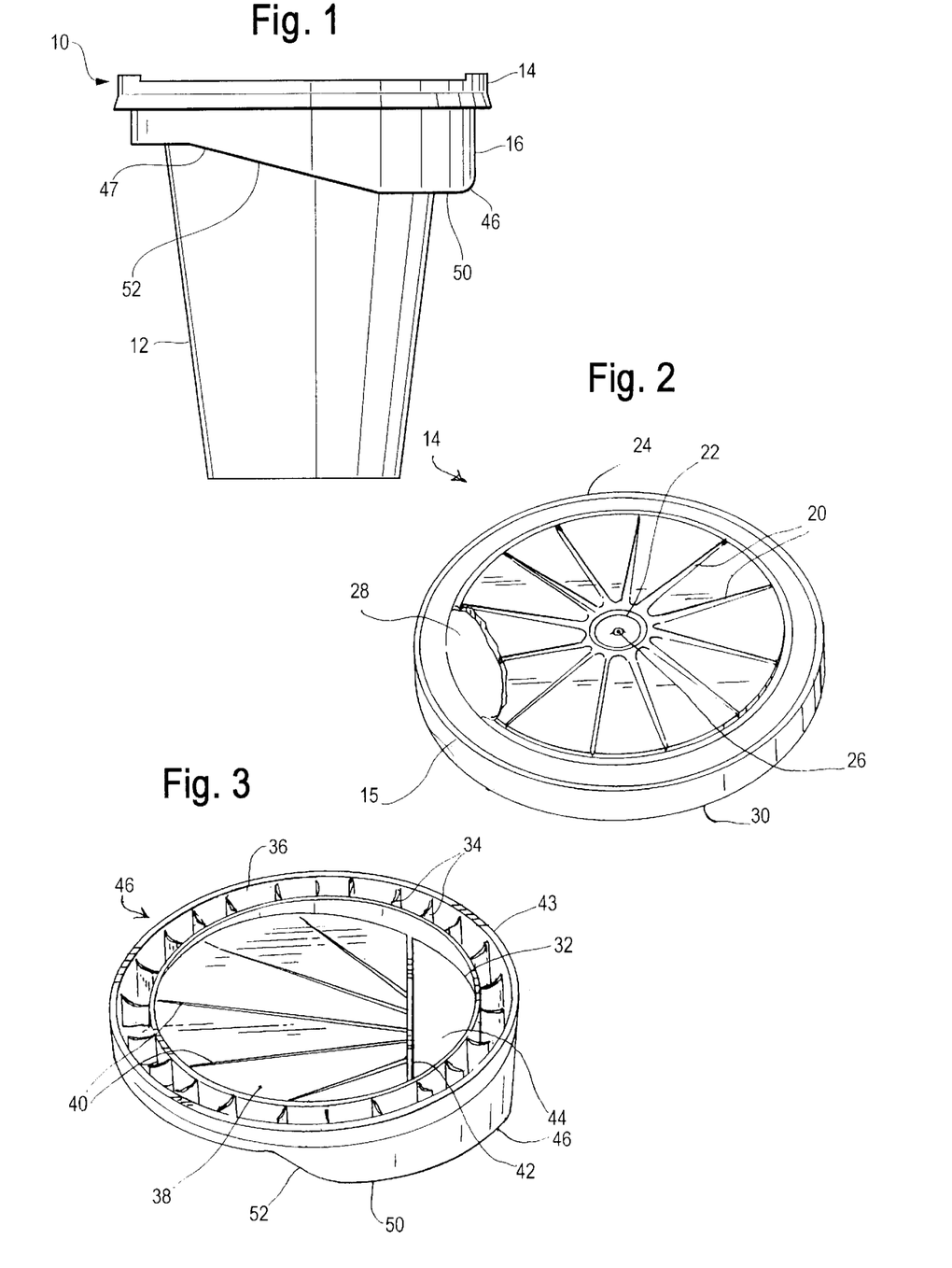
FIG. 1 is an elevational view of a coffee cup with an attached lid in accordance with a first embodiment of the present invention.
FIG. 2 is a perspective view of the upper component of the lid of FIG. 1.
FIG. 3 is perspective view of the lower component of the lid of FIG. 1.

With reference to FIG. 1, a lid in accordance with the present invention is embodied in a lid 10 for a cup 12. Advantageously, the lid 10 is adapted to fit onto a paper, plastic or styrofoam disposable coffee cup, such as are generally available from diners, luncheonettes and fancy coffee bars, but any lid in accordance with the present invention may be used with any cup or bowl, disposable or non-disposable, with an appropriately sized rim. Moreover, while the following description uses coffee as an example of the liquid held within the cup 12, it will be understood that the lid in accordance with the present invention may be used with a cup or bowl containing any hot liquid.

As shown in FIG. 1, the lid 10 has two primary elements: an upper component 14 and a lower component 16. The lower component 16 is adapted to be fitted onto the rim 18 of the cup 12 and the upper component 14 is mounted on the lower component 16. In some embodiments, the upper and lower components are manufactured separately and then permanently attached, in some embodiments the upper and lower components are manufactured separately and provided with an attachment structure, such as a clip-on structure, for removably mounting the upper component on the lower component, and in some embodiments the upper and lower components are manufactured together as a single unit.

FIG. 2 illustrates an embodiment wherein the upper and lower components are separately manufactured and left removably attachable, although they could be permanently attached, as will be discussed below. As shown in FIG. 2, the upper component 14 is similar in design to a conventional coffee cup lid. Thus, the upper component 14 is circular and advantageously made of a thin plastic sheet, with optional stiffeners such as ribs 20 and hubs 22 and 24 to help prevent the upper component 14 from bending or buckling too much when being attached to or removed from the lower component 16. A small hole 26 in the center of the upper component 14 is provided for venting when the cup 12 is tilted for drinking. Another opening in the upper component 14 is the sip opening 28, located at a first position by the periphery of the upper component 14. Comparing FIG. 1 with FIG. 4, it will be seen that the sip opening 28 is adjacent the rim 18 of the cup 12 when the lid 10 is mounted on the cup 12, so that the sip opening 28 is easily accessible for drinking.

In some embodiments, such as in FIG. 2, the upper component 14 is manufactured with the sip opening 28 as a permanent feature. However, in other embodiments, an upper component may be manufactured with a removable cover for the sip opening 28, such as a conventional tear-away or push-in portion, filling the sip opening 28 and designed to be removed when the drinker wishes to begin drinking the coffee.

Figure 4:
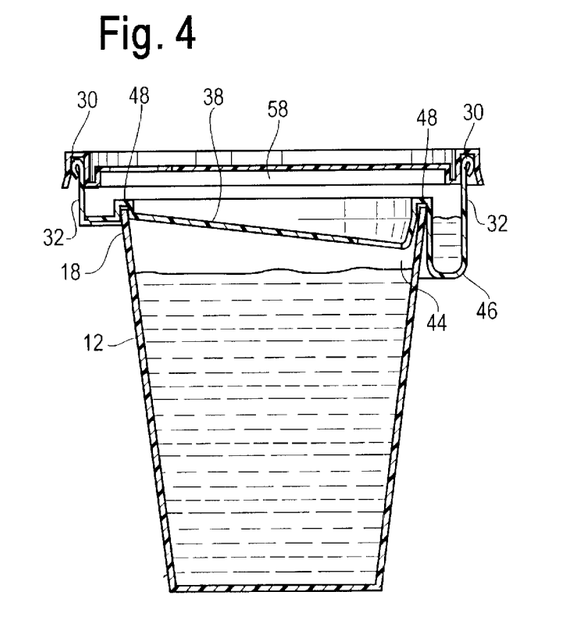
FIG. 4 is a cross-sectional view of the cup of FIG. 1 taken along line A—A in FIG. 2.

The upper component 14 has an attachment structure for, in this embodiment, removably attaching it to the lower component 16. As also shown in FIG. 4, this attachment structure may be in the form of a conventional inverted-U lip 30. Conventionally, such a lip 30 would fit onto the rim 18 of the cup 12, but in accordance with an aspect of the present invention here the lip 30 fits snugly onto an upwardly extending lid rim 32 of the lower component 16.

All of the above-discussed structure of the upper component 14 is conventional except for the fitting of the lip 30 onto the lower component rim 32 rather than the cup rim 18. As shown in FIG. 4, the diameter of the component rim 32 is slightly larger than the diameter of the cup rim 18, and in this case the upper component 14 would be manufactured correspondingly slightly larger than a conventional lid. However, since the basic design is the same, any increase in manufacturing cost would be minimal.

As another example, the lower component 16 could be manufactured with rim 32 being non-circular with a specific orientation, such as egg-shaped, and the upper component 14 would then be manufactured with its lip 30 in a matching shape. Such non-circular shapes are known as improvised circles. The advantage of such an oriented attachment structure is that then the upper component 14 could be mounted on the lower component 16 in only one orientation, and this in turn would guarantee that the sip opening 28 of the upper component 14 is always diametrically opposed to a spill opening 44 in the lower component 16, as will be described below.

Of course, if the two components are permanently attached, care would be taken that they be in the correct orientation.

As a further example, the upper component 14 could be made of styrofoam or other thick plastic while the lower component 16 is made of thinner plastic. This would provide an improved seal between the two components for a clip-on design.

Referring to FIG. 3, the lower component 16 in this embodiment is also circular, with the rim 32 projecting upwardly to receive the lip 30 of the upper component 14. In this embodiment, the lower component 16 is made of the same type of thin plastic as the upper component 14, with optional ribs 34 around the outer peripheral area 36 for stiffening. An element in the form of a central section 38 covers most of the surface of the lower component 16 within the periphery 36 of the lower component 16. The central section 38 also has stiffening ribs 40 and a reinforced edge 42, and slopes downwardly so that the edge 42 is the lowest part of the central section 38.

Between the edge 42 and the periphery 36 is a spill opening 44, located at a second position near the periphery 36 of the lower component 16. The edge 42 defines a portion of the perimeter of the spill opening 44, which is entirely within the lower component 16. A peripheral edge 43 completes the definition of the spill opening 44. In the illustrated embodiment, the spill opening 44 is generally in the shape of a semicircle, but of course it is not limited to this shape.

FIG. 4 is a cross-sectional view of the cup 12/lid 10 combination of FIG. 1 taken along line A—A in FIG. 2, which is a diameter bisecting the sip opening 28. When the upper component 14 is mounted on the lower component 16 with the proper orientation and the combination is mounted on the cup 12, the second position of the lower component 16, i.e. the position of the spill opening 44, is spaced from the first position of the upper component 14, i.e. the position of the sip opening 28, along a line (line A—A) corresponding to a diameter of the rim 18 of the cup 12. The spill opening 44 is therefore substantially spaced peripherally from the sip opening 28, ideally halfway around the periphery.

As shown in FIG. 3, in this alignment the line A—A also bisects the spill opening 44. FIG. 4 illustrates the downward slope of the central section 38 and the gap created by the spill opening 44.

An object of the present invention is to enable the hot coffee in the cup 12 to be cooled in a cooling spillover chamber 46. As shown in FIG. 4, the spillover chamber 46 is integrally connected to the lower component 16 and, when the lid 10 is mounted on the cup 12, is outside of the cup 12. More particularly, the lower component 16 includes a second attachment structure in the form of a conventional inverted U-shaped lip 48 that fits snugly over the rim 18 of the cup 12. However, extending around a substantial part of the periphery 36 of the lower component 16 centered around the spill opening 44, the lip 48 is extended downwardly outside of the cup 12 and then upwardly to form the spillover chamber 46, generally in the shape of an abbreviated torus. The outer edge of the spillover chamber 46 extends above the rim 18 of the cup 12 and supports, or forms, part of the rim 32 of the lower lid 16. As shown in FIG. 3, this part of the rim 32 is continuous with the remainder of the rim 32 around the rest of the periphery 36.

FIGS. 1 and 3 also illustrate that the spillover chamber 46 has a horizontal bottom level 50 extending around the position of the spill opening 44. Accordingly, when the cup 12 is tipped toward the spill opening 44, coffee will flow from within the cup 12 through the spill opening 44 and into the spillover chamber 46. During this process, the hot coffee flows safely away from the sip opening 28. At this spill tilt position, most of the coffee transferred to the spillover chamber 46 will be retained, while any excess will be returned to the interior of the cup 12 when the cup 12 is returned to horizontal.

Figure 5:
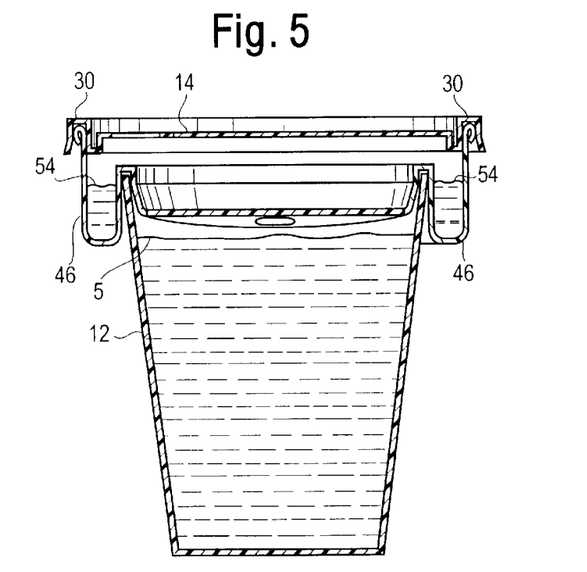
FIG. 5 is a cross-sectional view of the cup of FIG. 1 taken along line B—B in FIG. 2.

The lid 10 also provides a transfer structure providing a path to transfer liquid from the spillover chamber 46 to the sip opening. In this embodiment, this transfer structure includes both the central section 38 and an extension 47 of the spillover chamber 46 having a slanting bottom level 52 extending from the bottom level 50 up to the periphery 15 of the upper component 14 toward the sip opening 28. The central section 38 slopes downwardly at an angle small enough so that it does not generally return liquid to the interior-of the cup 12 when the cup 12 is tipped toward the sip opening 28. However, when there is coffee over the central section 38 after the cup 12 has been returned to horizontal, it returns down the central section 38 to the interior of the cup 12. As shown in FIG. 5, which is a cross-sectional view of the cup 12/lid 10 combination of FIG. 1 taken along line B—B in FIG. 2, and hence along line B—B in FIG. 3, and in FIG. 9, because the spillover chamber 46 is separate from the interior of the cup 12, the level 54 of coffee in the spillover chamber 46 is not necessarily the same as the level 56 of coffee in the cup 12.

FIGS. 4 and 5 further illustrate that when the upper component 14 is mounted on the lower component 16, the upper component 14 is spaced above the central portion 38 of the lower component 16 so that the upper and lower components 14, 16 define therebetween a cavity 58 through which liquid can flow. The bottom level 52 of the extension 47 is designed to terminate at or near the position of the sip opening 28 at rim 18, which is slightly higher than the level of the central portion 38. Therefore, the central portion 38 acts as a return surface for the lower component 16.

If there is coffee in the spillover chamber 46 and the cup 12 is then tipped toward the sip opening 28, coffee will flow through the extension 47 over the central section 38 to the sip opening 28, where it may be sipped. The cup 12 will be held at this position for the duration of the sip, during which time the central section 38 also acts as a barrier to prevent coffee within the cup 12 from being transferred directly to the sip opening 28 without having first passed through the spillover chamber 46.

Thus, in accordance with an advantageous aspect of the present invention, it is intended that as the cup 12 is tipped in a first direction toward the spill opening 44, hot liquid within the cup 12 will flow through the spill opening 44 safely away from the sip opening 28, thereby being prevented from flowing from within the cup 12 directly to the sip opening 28. In addition, as the cup 12 is tipped in a second direction toward the sip opening 28, it is intended that liquid will flow from the spillover chamber 46 to the sip opening 28, but again liquid is prevented from flowing from within the cup 12 to the sip opening 28.

The achievement of this result depends in part upon the above-noted alignment of the sip opening 28 relative to the spill opening 44. This alignment need not be exact, but it is important that the two openings be substantially separated around the peripheries so that tipping the cup 12 towards the two openings in turn entails tipping the cup 12 in substantially different, preferably opposite, directions. Therefore, in order to accommodate both left-handed and right-handed drinkers, it is preferable that the two openings be diametrically opposed. This positioning may be facilitated by, for example, improvised circular shapes of the attachment structure mounting the upper component on the lower component, or, for example, by matching detents and/or grooves on the upper and lower components.

Figure 6:
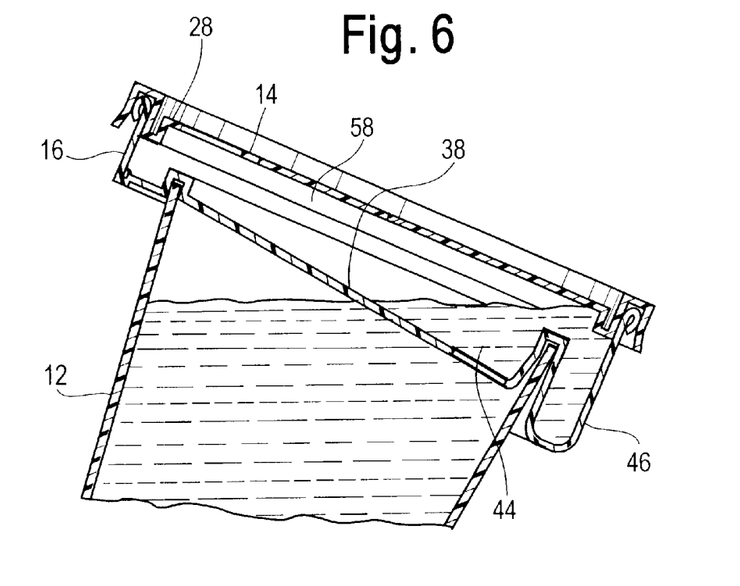
FIG. 6 is a partial view of FIG. 4 showing the cup being tipped to fill the spillover chamber.

The use of the lid 10 to provide quick sips of cooled coffee is as follows. FIG. 4 illustrates the cup 12 in a horizontal or neutral position. Initially, there is hot coffee only in the interior of the cup 12. The drinker will then usually be holding the cup 12 so that the sip opening 28 is facing towards him, with the spill opening 44 at the opposite position away from him. As shown in FIG. 6, the cup 12 is then tipped in the first direction to a filling position, away from the drinker and towards the spill opening 44. As a result, the hot coffee in the cup 12 flows out through the spill opening 44 and through the cavity 58 into the spillover chamber 46. FIG. 6 shows a state existing if the cup 12 remains tipped, but it will be understood that in practice the tipping may be a simple back-and-forth motion to spill a small amount of coffee in a natural flow path into the spillover chamber 46. The upper component 14 prevents the hot coffee from spilling out over the top over the spillover container 46. Because of the positioning of the spill opening 44 relative to the sip opening 28, at the spill tilt position the coffee will flow only in a path from the interior of the cup 12 to the spill opening 44 and thence to the spillover chamber 46, safely away from sip opening 28. Because of the barrier 38, the coffee cannot flow in any path leading to the sip opening 28, and therefore there is no risk that the hot coffee will spill out onto the drinker's hands or elsewhere.

When the cup 12 is then returned to its horizontal position, any hot coffee in the cavity 58 will return down the central portion 38 and through the spill opening 44 back into the cup 12. The relatively small amount of hot coffee transferred to the spillover chamber 46, e.g. only enough for one or two sips, will automatically give away some of its heat to the mass of the wall of its new container, and thereafter the cooling process will continue with the outside air acting as the primary cooling agent. It is expected that rather quickly, e.g. in 3–5 seconds, the spillover coffee temperature will drop significantly so as to allow relatively safe consumption.

The heat exchange process could be further enhanced by the introduction of contours in the bottom and sides of the spillover chamber 46. which will increase the heat transfer area, and therefore the cooling rate, of the contained liquid (see FIG. 25 below).

Figure 7:
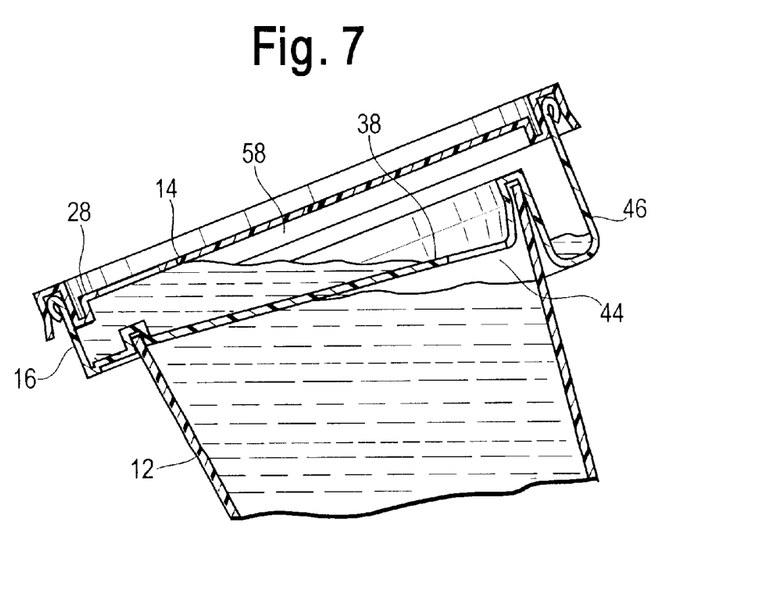
FIG. 7 is a partial view of FIG. 4 showing the cup being tipped for drinking.

When the drinker wishes to take a sip, he performs the natural action of tipping the cup 12 towards him, bringing the sip opening 28 to his lips. This action moves the cup 12 to a sipping position, illustrated in FIG. 7, with the cup 12 tipped in the second direction towards the sip opening 28. This causes the cooled coffee in the spillover chamber 46 to flow through the extension 47 and over the rim 18 into the cavity 58 and towards the sip opening 28 to be consumed by the drinker. Coffee at the sip opening 28 in the state shown in FIG. 7 would spill out, but it is presumed that the drinker is sipping the available coffee. At the same time, the central section 38 of the lower lid 16 acts as a barrier to prevent any of the hot coffee in the cup 12 itself from flowing directly to the sip opening 28. Thus, the sip opening 28 is not directly accessible from the interior of the cup 12, regardless of what direction the cup 12 is tipped. By using these two actions repeatedly, the drinker can safely and more quickly have his coffee at his/her desired temperature.

Figure 8:
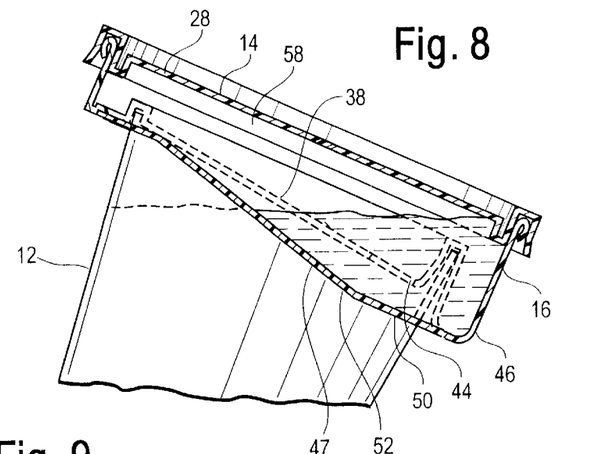
FIG. 8 is a conceptual view of the cup, showing the cup being tipped to fill the spillover chamber.
Figure 9:
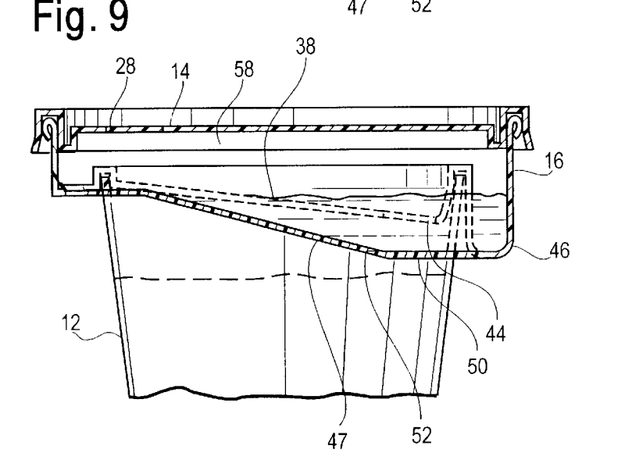
FIG. 9 is a view of FIG. 8, showing the cup in a neutral position after being tipped to fill the spillover chamber.
Figure 10:
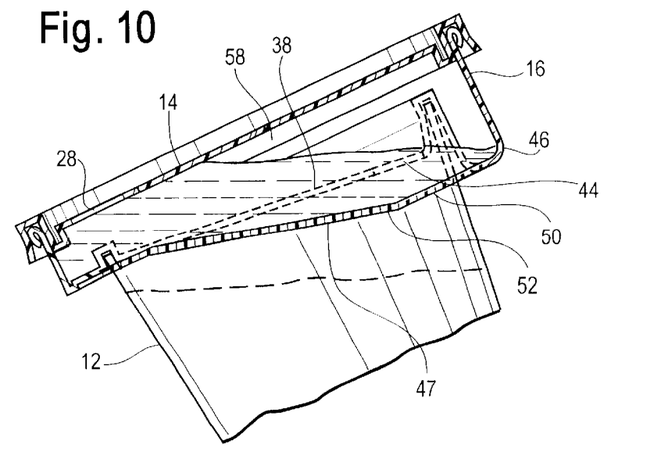
FIG. 10 is a partial view of FIG. 8 showing the cup being tipped for drinking.

FIGS. 8–10 also illustrate the three positions of the cup 12. These Figures are conceptual, as they do not correspond exactly to a cross-section, but rather illustrate several levels at once within the cup 12. As a result, these Figures provide a different view of the relationships between the elements. In particular, these Figures demonstrate the relationship between the bottom levels 50, 52 of the spillover chamber 46 and extension 47 outside of the cup 12, the central portion 38 and the cavity 58.

FIG. 8 illustrates the cup 12 in its filling position, FIG. 9 illustrates the cup 12 in its neutral position after the spillover chamber 46 has been filled, and FIG. 10 illustrates the cup 12 in its sipping position.

As noted above, in this embodiment the upper and lower components are manufactured separately and remain removably attachable. However, it is also possible to mount the upper component on the lower component and permanently attach it there, for example by thermal welding, of which ultrasonic welding is one method, or the like of the lip 30 to the rim 32, or to manufacture both components as a unit in a single process such as injection molding.

Figure 11:
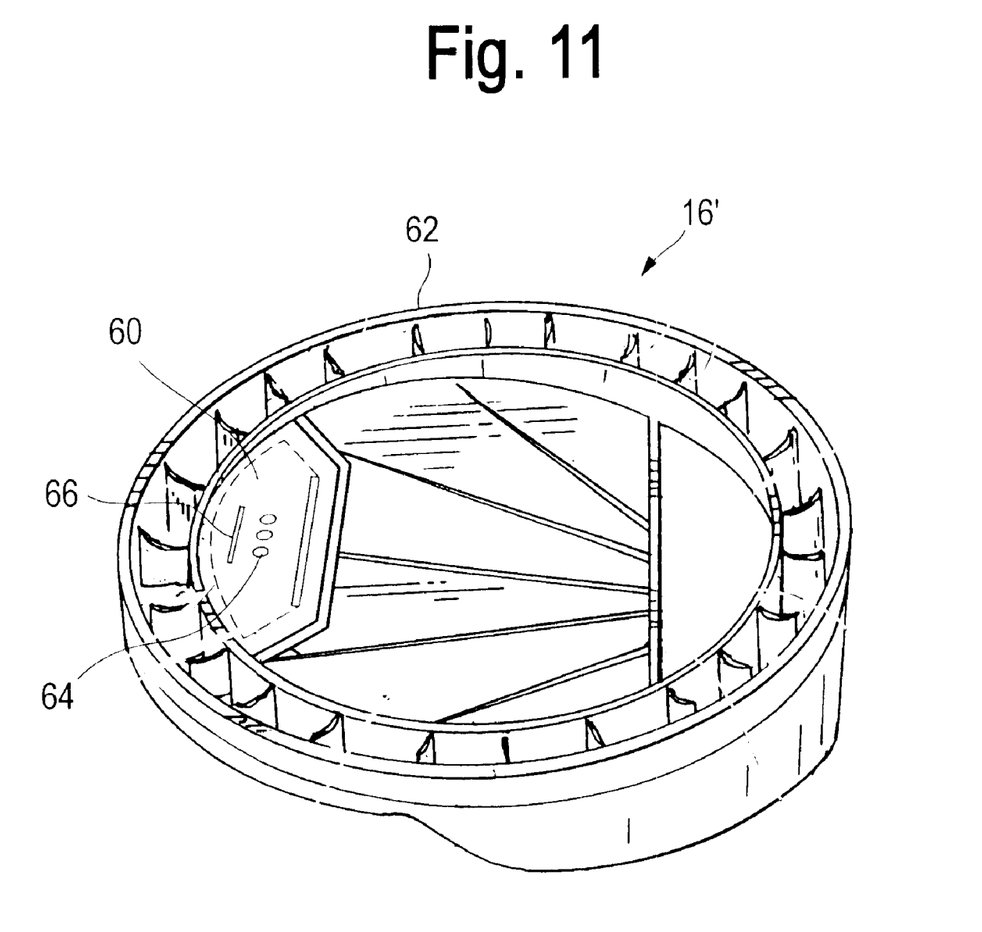
FIG. 11 is a perspective view of another embodiment of the lower component.

FIG. 11 illustrates a modified version of the lower component 16. Here, lower component 16' includes a tear-away portion 60 connected to in the lower component 16' by a hinge 62. The tear-away portion 60 includes vent holes 64 that function during the spillover process. However, when the temperature of the coffee in the cup 12 has dropped to the desired temperature and there is no need for further cooling, there is consequently no further need for use of the spillover process. In such case, without removing the upper component 14, the drinker can using his hand or a sharp implement such as a pen or coffee stirrer to drive through the sip opening 28 down onto the tear-away portion 60. This pushes the tear-away portion 60 down to open the sip opening 28 to the interior of the cup. If desired, the upper component 14 could be removed before or after the tear-away portion 60 is pushed open. Alternatively, the lid as a whole can be removed so that the tear-away portion 60 can be pulled down by a tab projecting down from an indent 66.

Figure 12:
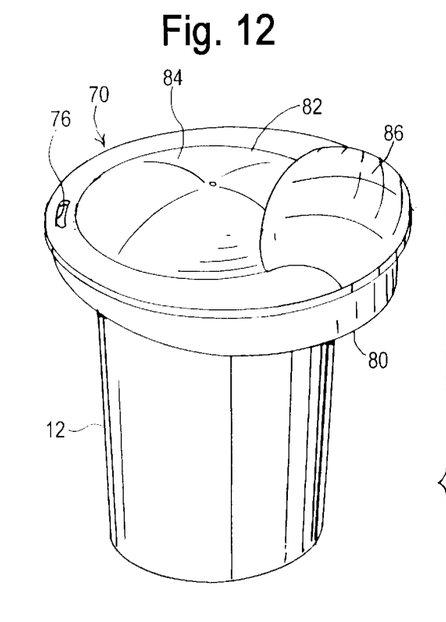
FIG. 12 is perspective view of a cup with an attached lid in accordance with a further embodiment of the present invention.

FIG. 12 illustrates a further embodiment of the present invention, here in the form of the cup 12 bearing a lid 70. As in the other embodiments, the lid 70 may be initially manufactured as separate upper and lower components 72, 74 which are attachable or permanently attached, or the lid 70 may be manufactured as a unit.

Figure 13:
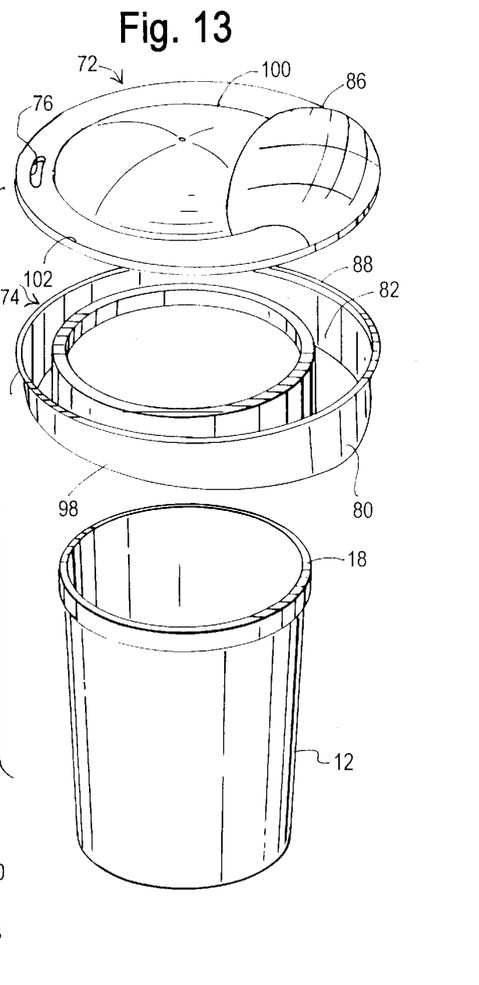
FIG. 13 is an exploded view of the cup, lower component and upper component of the embodiment of FIG. 12.
Figure 14:
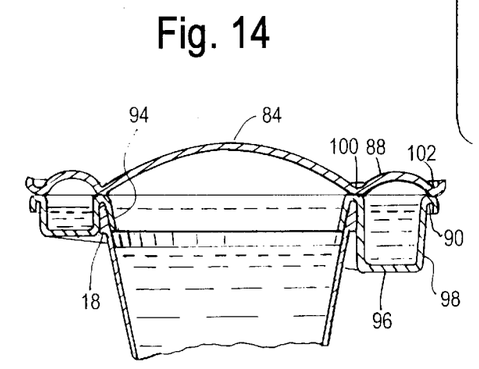
FIG. 14 is a partial cross-sectional view taken along line C—C in FIG. 12.
Figure 15:
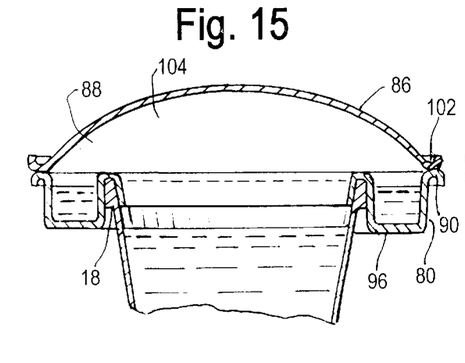
FIG. 15 is a partial cross-sectional view taken along line D—D in FIG. 12.

More particularly, the lid 70, like the lid 10, has an upper component 72 with a sip opening 76 at a first point on a convex peripheral surface 78, and a lower component 74 having a toroidal spillover chamber 80 partially open to receive liquid from the interior of the cup 12. A vent hole 82 is provided in the center of the upper component 72. The upper component 72 has a central surface 84, which may be flat but is advantageously convex, and, at a position diametrically opposed to the sip opening 76, a further raised surface defining a protrusion 86. The peripheral surface 78 runs around the lid 70 from one end of the protrusion 86 to the other FIG. 13 illustrates the cup 12, lower component 74 and the upper component 72 in exploded form. The lower component 74 is generally in the form of a toroid sliced in half horizontally, with an inner rim 88, an outer rim 90 and trough 92 with a U-shaped cross-section each running all the way around the periphery. As illustrated in FIGS. 14 and 15, which are respectively cross-sections taken along lines C—C and D—D in FIG. 12, the lower component has a lip 94 or other clip-on structure for mounting the lower component 74 on the rim 18 of the cup 12. The inner rim 88 mounts over the rim 18 of the cup 12 and the outer rim 90 is outside of the cup 12, so that the trough 92 forms the lower portion 96 of the spillover chamber 80 underneath the protrusion 86 of the upper component 72. The trough 92 also forms the lower portion of an extension 98 running from the spillover chamber 80 around the lid to the sip opening 76.

The upper portion of the spillover chamber 80 is formed by the protrusion 86 and the upper portion of the extension 98 is formed from the peripheral surface 78 of the upper component 72. As shown in FIGS. 12 and 13, the peripheral surface 78 runs approximately two thirds of the way around the lid 70 surrounding the sip opening 76. For this portion of the lid 70, an inner ring 100 of the peripheral surface 78, shown in FIG. 14, rests over the upper portion of the lip 94 of the inner rim 88 of the lower component 74. The peripheral surface 78 then extends to an outer ring 102 up to the outer rim 90 of the lower component 74. The inner ring 100 is welded to the lip 94 and the outer periphery of surface 78 forming outer ring 102 is welded to the lip 90 so that liquid cannot pass through, thereby forming the extension 98. As result, for this part of the lid 70, the extension 98 is isolated from the interior of the cup 12 by the barrier formed by the sealed inner ring 100 and inner rim 88. Liquid within the cup 12 cannot, therefore, flow directly from the interior of the cup 12 to the sip opening 28.

Figure 16:
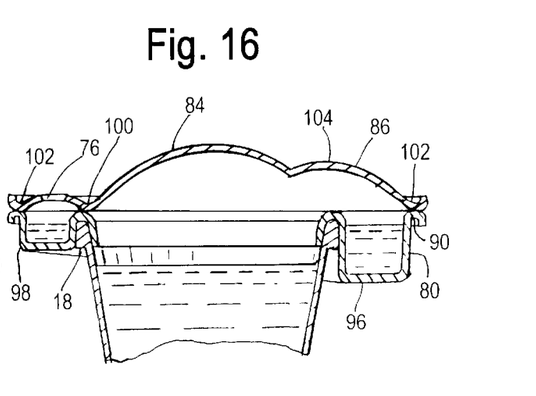
FIG. 16 is a partial cross-sectional view taken along line E—E in FIG. 12.

However, as shown in FIG. 15, for the approximately one third of the lid 70 corresponding to the protrusion,86, the spillover chamber 80 is not isolated from the interior of the cup 12. While here the outer ring 102 remains sealed to the outer rim 90, there is no inner rim, and so there is no barrier. That is, while the outer ring 102 forms a complete circle and entirely seals the outside of the lid 70 to prevent coffee from spilling onto the drinker's hands, the inner ring 100 is approximately semicircular and terminates where the protrusion 86 begins. Consequently, there is a space between the protrusion 86 and the inner rim 88. This space, as shown more clearly in FIG. 16, which is a cross-section along line E–E in FIG. 12, constitutes a spill opening 104 through which liquid from the interior of the cup 12 may flow into the spillover chamber 80 when the cup 12 is tipped in the direction of the spillover chamber 80, i.e. in the direction of the spill opening 104. When the cup 12 is tipped in this direction, any hot coffee can only flow safely toward the spill opening 104 and not to the sip opening 76. Accordingly, the inner rim 88 at this position constitutes an edge of the lower component 74 that defines a portion of the perimeter of the spill opening 104. The rest of the perimeter of the spill opening 104 is formed by the protrusion 86.

FIGS. 17–22 illustrate a further development of this embodiment, wherein the lid 106 has the same lower component 74, but a slightly different upper component 108. In general, the upper component 108 is identical to that of lid 70 of FIG. 12 with the exception that the sip opening 76 is raised slightly from its original position, while the protrusion 86, which in conjunction with the lower component 74 is defining the pathway for the transfer of hot liquid to the spillover chamber 80, is structurally modified so as to increase the lid's overall stiffness. Therefore, through a central indentation on protrusion 86, a double arched formation is created with arches 110a, 110b having adjacent walls merging at the bottom to a common bearing tip 113 resting over the rim 88. This has created a support structure 112 which is providing the additional stiffness to the lid 106 required for a perfect fit in the mounting process that will ensure an all-around leak tight condition. In order to assure further rigidity, the tip 113 will be tack welded to the rim 88.

Figures 17, 18, 19:
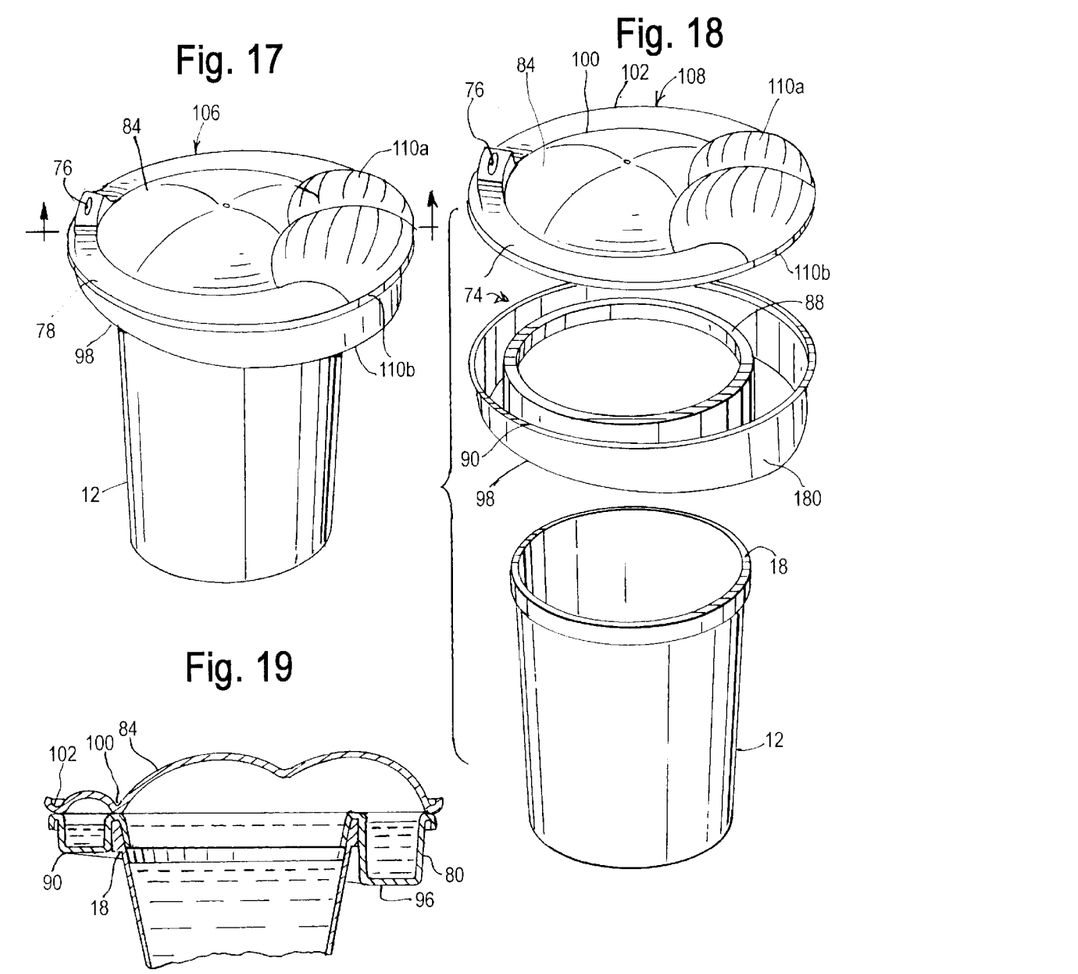
FIG. 17 is a perspective view of a cup with an attached lid in accordance with another embodiment of the present invention.
FIG. 18 is an exploded view of the cup, lower component and upper component of the embodiment of FIG. 17.
FIG. 19 is a partial cross-sectional view taken along line G—G in FIG. 17.
Figure 20:
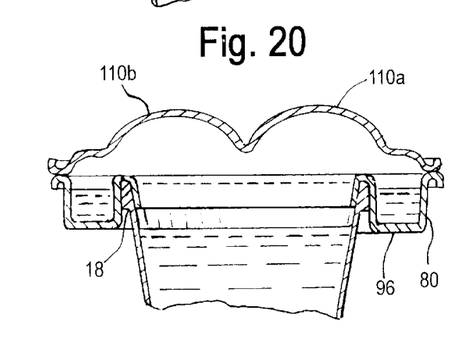
FIG. 20 is a partial cross-sectional view taken along line H—H in FIG. 17.
Figure 21:
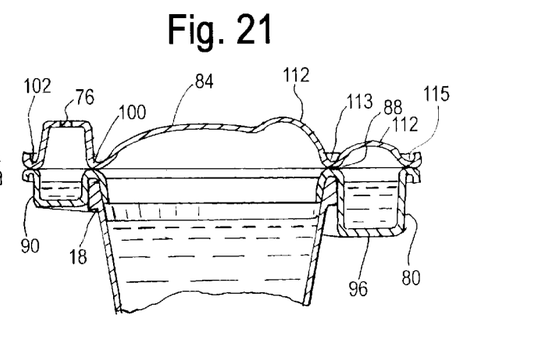
FIG. 21 is a partial cross-sectional view taken along line I—I in FIG. 17.
Figure 22:
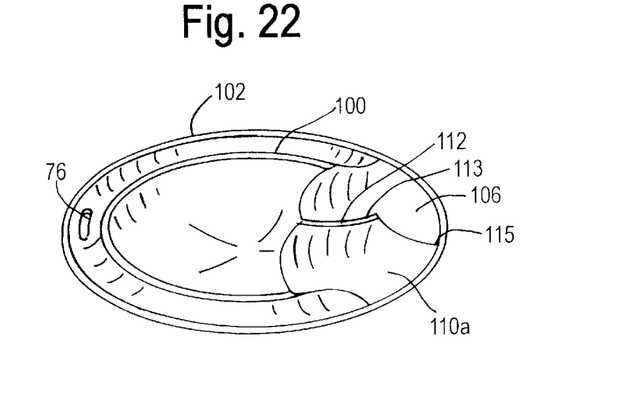
FIG. 22 is a view of the underside of the upper component of FIG. 18.

Instead of a unitary spill opening, this embodiment includes two openings, but these openings form a composite spill opening 114 connecting the interior of the cup 12 with the spillover chamber 80.

In the embodiments of FIGS. 12 and 17, the extension 98 of the spillover chamber 80 is isolated from the interior of the cup 12 as it extends all the way around the lid 70 with a rising lower level 75. The sip opening 76 is open only to the extension 98, not to the interior of the cup 12. Accordingly, in this embodiment, the transfer structure includes the extension 98, while the barrier preventing the direct transfer of the coffee from within the cup 12 directly to the sip opening 76 is formed from the connection of the lower component 74 to the upper component at the inner rim 88.

It will be understood that three or more protrusions, with a support between each pair, could be provided to provide even greater rigidity, if desired.

As noted above, the spillover chamber 80 is outside of the cup 12. Consequently, the spillover chamber 80 performs the same cooling function as the spillover chamber 46 using the same type of two-step spilling/sipping process.

Figure 23:
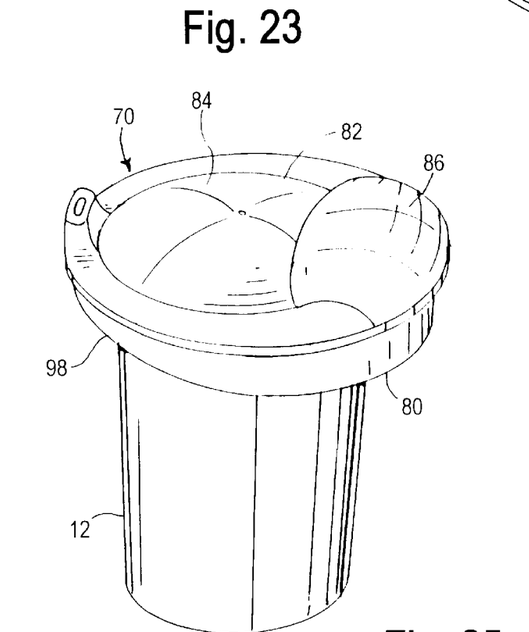
FIG. 23 is a perspective view of a cup with an attached lid in accordance with yet another embodiment of the present invention.
Figure 24:
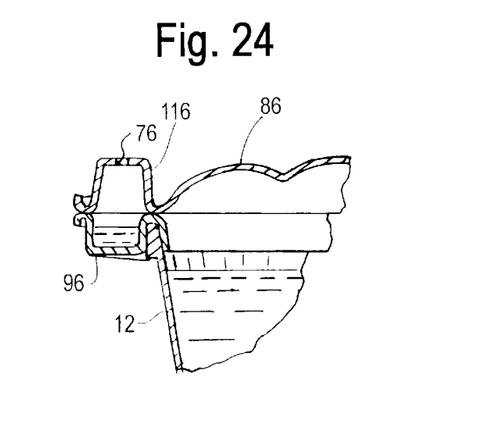
FIG. 24 is a partial cross-sectional view taken along line J—J in FIG. 23.

FIGS. 23 and 24 illustrate a further variation of the embodiment of FIG. 17. Here, the sip opening 76 is located in a raised portion 116 on the peripheral surface 78. This raised portion 116 is shown in cross-section in FIG. 24. This is intended to make it easier to drink from the sip opening 76 without spilling.

Figure 25:
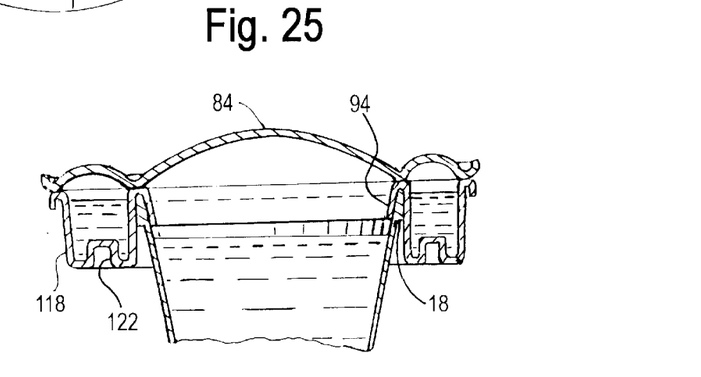
FIG. 25 is a partial cross-sectional view of another embodiment of the present invention.

FIG. 25 illustrates yet another variation of the lid in accordance with the present invention. Here, the spillover chamber 118, and optionally the extension, include a contour 122 that increases the surface area, i.e. the heat transfer area, of the spillover chamber 80. This increases the cooling rate of the contained liquid.

Figure 26:
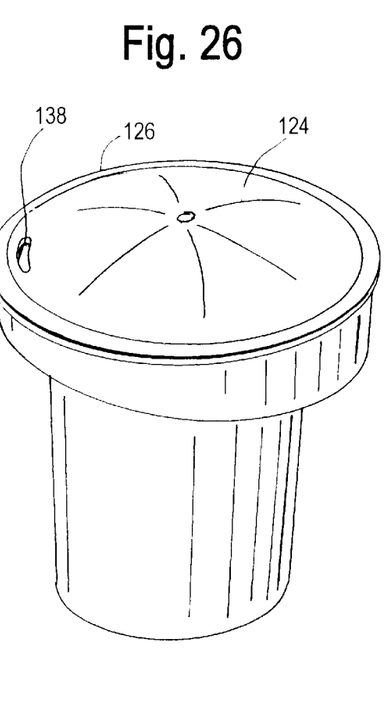
FIG. 26 is a perspective view of a cup with an attached lid in accordance with yet another embodiment of the present invention.
Figure 27:
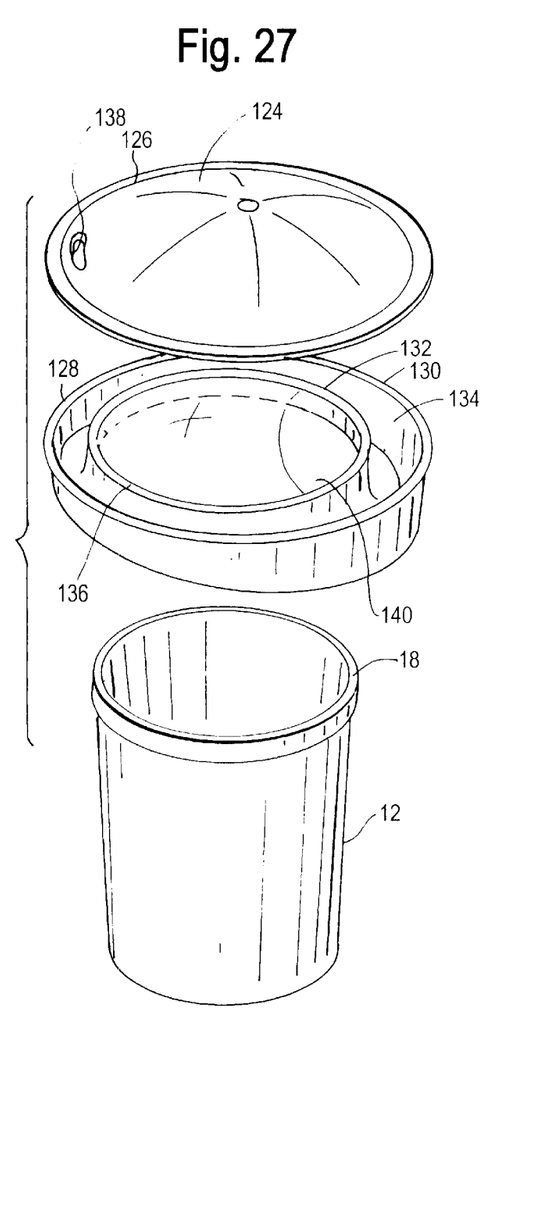
FIG. 27 is an exploded view of the cup, lower component and upper component of the embodiment of FIG. 26.

FIGS. 26 and 27 illustrate a variation combining elements of the embodiments of FIGS. 1 and 12. Here there are no protrusions, and the entire surface 124 of the upper component 126 is convex. The lower component 128 has an outer rim 130 and an inner rim 132 with a U-shaped trough 134 therebetween, as in the embodiment of FIG. 12, and has a central portion 136, corresponding to central portion 38 in FIG. 3. However, central portion 136 is convex to meet the inner rim 132, rather than down-sloping. As a result, after the drinker has tipped the cup toward the sip opening 138 to take a sip and has returned the cup 12 to horizontal, any coffee sitting above the central portion 136 will return to the trough 134, not to the sip opening 140. This keeps the cooled coffee from mingling with the hotter coffee in the interior of the cup 12.

Many other variations are possible in accordance with the present invention. For example, the upper and lower components 14, 16 need not be circular, but can take other shapes in dependence upon the shape of the cup or bowl they are intended to cover. All that is required is that the lip 48 of the lower component 16 match the rim 18 of the cup and that the lip 30 of the upper component 14 match the rim 32 of the lower component 16.

As another example, the lids may be made in different sizes to fit different sizes of cups. For example, it is customary to provide cups in three different sizes, and the lid in accordance with the present invention could be manufactured to match the cup sizes.

As yet another example, the upper component need not match a conventional lid, but can be modified to meet any desired result.

Moreover, any of the variations described for a particular embodiment may be employed in any of the other embodiments.

The above-disclosed structure can also be used for warming a small part of a liquid colder than the surrounding environment.

While the present invention has been described with reference to the foregoing embodiments, changes and variations may be made therein which fall within the scope of the appended claims.

I claim:

1. A lid for a cup, the cup having a rim and an outermost perimeter defining a farthest horizontal extent of an interior of the cup in its upright orientation, said lid comprising:
   a first component having a sip opening, said sip opening being located on said first component so as to be adjacent the rim of the cup when said lid is mounted on the cup to be accessible for sipping therefrom by a user when the cup is tipped toward said sip opening;
   a second component having an edge defining at least a portion of a perimeter of a spill opening, said spill opening being spaced from said sip opening substantially along a line corresponding to a diameter of the rim of the cup when said lid is mounted on the cup;
   a spillover chamber connected to said second component so as to receive liquid from the interior of the cup through said spill opening when the cup is tipped toward said spill opening, said spillover chamber being substantially entirely horizontally outside of the outermost perimeter of the cup when said lid is mounted on the cup; and
   a transfer structure providing a path to transfer liquid from said spillover chamber to said sip opening when the cup is tipped toward said sip opening, said transfer structure including a barrier to prevent transfer of liquid from the interior of the cup to said sip opening without passing through said spillover chamber in any tipping position of the cup.

2. The lid of claim 1, wherein said sip opening is diametrically opposed to said spill opening.

3. The lid of claim 1, wherein said perimeter of said spill opening is entirely within said second component.

4. The lid of claim 3, wherein said transfer structure comprises an extension of said spillover chamber toward said sip opening, said extension being open to the interior of the cup, said transfer structure further comprising a return surface sloping downwardly from said extension toward said spill opening to return any excess liquid from said transfer structure to the interior of the cup.

5. The lid of claim 4, wherein said return surface slopes downwardly at an angle small enough that said return surface returns liquid from said extension to the interior of the cup only when the cup is horizontal.

6. The lid of claim 4, wherein said return surface comprises said barrier.

7. The lid of claim 1, wherein said edge is an upper edge of said second component such that said perimeter of said spill opening is defined only in part by said second component.

8. The lid of claim 7, wherein said transfer structure comprises an extension of said spillover chamber to said sip opening, said extension being isolated from the interior of the cup by a wall and said wall comprising said barrier.

9. The lid of claim 8, wherein said perimeter of said spill opening is defined by said upper edge of said second component and an outer surface of said first component.

10. The lid of claim 1, wherein said first and second components are manufactured separately and then connected by a selected one of a clip-on process and thermal welding.

11. The lid of claim 1, wherein said first component includes at least one support in contact with said second component for imparting rigidity to said first component.

12. The lid of claim 1, wherein said first component includes a double arched formation which, in conjunction with said second component, defines a pathway through which spillover liquid transfers to said spillover chamber, said formation being comprised of a plurality of arches, where adjacent walls of said arches merge at their bottoms to form a bearing tip that rests directly over the rim of the cup.

13. A lid for a cup, the cup having an outermost perimeter defining a farthest horizontal extent of an interior of the cup in its upright orientation, said lid comprising:
   an upper component having a sip opening positioned on said upper component to be accessible for sipping therefrom by a user when said lid is mounted on the cup and the cup is tipped toward said sip opening; and
   a lower component having an edge defining at least a portion of a perimeter of a spill opening and a spillover chamber open to said spill opening,
   wherein said spillover chamber is positioned on said lid so as to be substantially entirely horizontally outside of the outermost perimeter of the cup when said lid is mounted on the cup, and
   wherein, when said lower component is attached to said upper component with said spill opening substantially spaced peripherally from said sip opening, said upper component and said lower component define a cavity therebetween allowing liquid to flow in a selected one only of first and second paths depending upon a tipping direction of said lid, wherein said first path is from said spill opening to said spillover chamber and said second path is from said spillover chamber to said sip opening.

14. The lid of claim 13, wherein said sip opening is diametrically opposed to said spill opening.

15. The lid of claim 13, wherein said lid further comprises an extension of said spillover chamber toward said sip opening, said extension being open to the interior of the cup, and a return surface sloping downwardly from said extension toward said spill opening to return any excess liquid from said transfer structure to the interior of the cup, said second path extending through said extension.

16. The lid of claim 15, wherein said return surface slopes downwardly at an angle small enough that said return surface returns liquid from said extension to the interior of the cup only when the cup is horizontal.

17. The lid of claim 15, wherein said return surface comprises a barrier preventing transfer of liquid from with the cup to said sip opening without passing through said spillover chamber in any tipping position of the cup.

18. The lid of claim 13, wherein said lid further comprises an extension of said spillover chamber to said sip opening, said extension being isolated from the interior of the cup by a wall and said wall comprising a barrier preventing transfer of liquid from the interior of the cup to said sip opening without passing through said spillover chamber in any tipping position of the cup, said second path extending through said extension.

19. The lid of claim 13, wherein said upper and lower components are manufactured separately and then connected by a selected one of a clip-on process and thermal welding.

20. The lid of claim 13, wherein said upper and lower components are manufactured as one unit by an injection process.

21. The lid of claim 13, wherein said upper component includes at least one support imparting rigidity to said first component.

22. A method of drinking from a cup with a rim having a lid mounted thereon, the cup further having an outermost perimeter defining a farthest horizontal extent of an interior of the cup in its upright position, wherein the lid comprises a first component having a sip opening, the sip opening being located on the first component so as to be adjacent the rim of the cup when the lid is mounted on the cup to be accessible for sipping therefrom by a user when the cup is tipped toward the sip opening, a second component having an edge defining at least a portion of a perimeter of a spill opening, the spill opening being spaced from the sip opening substantially along a line corresponding to a diameter of the rim of the cup when the lid is mounted on the cup, a spillover chamber connected to the second component so as to receive liquid from the interior of the cup through the spill opening when the cup is tipped toward the spill opening, the spillover chamber being substantially entirely horizontally outside of the outermost perimeter of the cup when the lid is mounted on the cup, and a transfer structure providing a path to transfer liquid from the spillover chamber to the sip opening when the cup is tipped toward the sip opening, the transfer structure including a barrier to prevent transfer of liquid from the interior of the cup to the sip opening without passing through the spillover chamber in any tipping position of the cup, said method comprising the steps of:
first tipping the cup in a direction toward the spill opening so that liquid in the interior of the cup flows through the spill opening into the spillover chamber; and
subsequently tipping the cup in a direction toward the sip opening so that liquid in the spillover chamber flows through the transfer structure to the sip opening.

23. A method of drinking from a cup having a lid mounted thereon, the cup having an outermost perimeter defining a farthest horizontal extent of an interior of the cup in its upright orientation, wherein the lid comprises an upper component having a sip opening positioned on the upper component to be accessible for sipping therefrom by a user when the lid is mounted on the cup and the cup is tipped toward the sip opening, and a lower component having an edge defining at least a portion of a perimeter of a spill opening and a spillover chamber open to the spill opening, wherein the spillover chamber is positioned on the lid so as to be substantially entirely horizontally outside of the outermost perimeter when the lid is mounted on the cup, and wherein, when the lower component is attached to the upper component with the spill opening substantially spaced peripherally from the sip opening, the upper component and the lower component define a cavity therebetween allowing liquid to flow in a selected one only of first and second paths depending upon a tipping direction of the lid, wherein the first path is from the spill opening to the spillover chamber and the second path is from the spillover chamber to the sip opening, said method comprising the steps of:
first tipping the cup in a direction toward the spill opening so that liquid in the interior of the cup flows through the spill opening into the spillover chamber; and
subsequently tipping the cup in a direction toward the sip opening so that liquid in the spillover chamber flows through the cavity to the sip opening.

24. A combination of a cup and a lid, said cup having a rim and an outermost perimeter defining a farthest horizontal extent of an interior of said cup, and said lid comprising:
a first component having a sip opening, said sip opening being located on said first component so as to be adjacent the rim of said cup when said lid is mounted on said cup to be accessible for sipping therefrom by a user when said cup is tilted toward said sip opening;
a second component having an edge defining at least a portion of a perimeter of a spill opening, said spill opening being spaced from said sip opening substantially along a line corresponding to a diameter of said rim of said cup when said lid is mounted on said cup;
a spillover chamber connected to said second component so as to receive liquid from said interior of said cup through said spill opening when said cup is tipped toward said spill opening, said spillover chamber being substantially entirely horizontally outside of said outermost perimeter when said lid is mounted on said cup; and
a transfer structure providing a path to transfer liquid from said spillover chamber to said sip opening when said cup is tipped toward said sip opening, said transfer structure including a barrier to prevent transfer of liquid from said interior of said cup to said sip opening without passing through said spillover chamber in any tipping position of said cup.

25. A combination of a cup and a lid, said cup having an outermost perimeter defining a farthest horizontal extent of an interior of said cup, wherein said lid comprises:
an upper component having a sip opening positioned on said upper component to be accessible for sipping therefrom by a user when said lid is mounted on said cup and said cup is tipped toward said sip opening; and
a lower component having an edge defining at least a portion of a perimeter of a spill opening and a spillover chamber open to said spill opening,
wherein said spillover chamber is positioned on said lid so as to be substantially horizontally outside of said outermost perimeter when said lid is mounted on said cup, and
wherein, when said lower component is attached to said upper component with said spill opening substantially spaced peripherally from said sip opening, said upper component and said lower component define a cavity therebetween allowing liquid to flow in a selected one only of first and second paths depending upon a tipping direction of said lid, wherein said first path is from said spill opening to said spillover chamber and said second path is from said spillover chamber to said sip opening.

26. A lid for a cup, the cup having an outermost perimeter defining a farthest horizontal extent of an interior of the cup in its upright orientation, said lid comprising:
a component having a sip opening positioned on said component to be accessible for sipping therefrom by a user when said lid is mounted on the cup and the cup is tipped toward said sip opening;
a spillover chamber for receiving liquid from the interior of the cup when the cup is tipped in a direction away from said sip opening, said spillover chamber being substantially entirely horizontally outside of the outermost perimeter when said lid is mounted on the cup to enable a temperature change of liquid within said spillover chamber faster than a temperature change of liquid in the interior of the cup; and a transfer structure providing a path to transfer liquid from said spillover chamber to said sip opening when the cup is tipped toward said sip opening.

27. The lid of claim 26, wherein said transfer structure includes a barrier to prevent transfer of liquid from the interior of the cup to said sip opening without passing through said spillover chamber in any tipping position of the cup.

28. A combination of a lid and a cup, said cup having an outermost perimeter defining a farthest horizontal extent of an interior of said cup in its upright orientation, said lid comprising:

a component having a sip opening positioned on said component to be accessible for sipping therefrom by a user when said lid is mounted on said cup and said cup is tipped toward said sip opening;

a spillover chamber for receiving liquid from said interior of said cup when said cup is tipped in a direction away from said sip opening, said spillover chamber being substantially entirely horizontally outside of the outermost perimeter when said lid is mounted on the cup to enable a temperature change of liquid within said spillover chamber faster than a temperature change of liquid in said interior of said cup; and a transfer structure providing a path to transfer liquid from said spillover chamber to said sip opening when said cup is tipped toward said sip opening.

29. The combination of claim 28, wherein said transfer structure includes a barrier to prevent transfer of liquid from within said cup to said sip opening without passing through said spillover chamber in any tipping position of said cup.

30. A method of drinking from a combination of a lid and a cup, where the cup has an outermost perimeter defining a farthest horizontal extent of an interior of the cup in its upright orientation, and the lid comprises a component having a sip opening positioned on the component to be accessible for sipping therefrom by a user when the lid is mounted on the cup and the cup is tipped toward the sip opening, a spillover chamber for receiving liquid from the interior of the cup when the cup is tipped in a direction away from the sip opening, the spillover chamber being substantially entirely horizontally outside of the outermost perimeter when the lid is mounted on the cup to enable a temperature change of liquid within the spillover chamber faster than a temperature change of liquid in the interior of the cup and a transfer structure providing a path to transfer liquid from the spillover chamber to the sip opening when the cup is tipped toward the sip opening, said method comprising the steps of:

first tipping the cup so that liquid in the interior of the cup flows into the spillover chamber; and subsequently tipping the cup ward the sip opening so that liquid in the spillover chamber flows to the sip opening.

* * * * *